United States Patent [19]

Johnson

[11] 4,244,023
[45] Jan. 6, 1981

[54] MICROPROCESSOR-BASED ENGINE CONTROL SYSTEM WITH ACCELERATION ENRICHMENT CONTROL

[75] Inventor: Edwin A. Johnson, Clarkston, Mich.

[73] Assignee: The Bendix Corporation, Southfield, Mich.

[21] Appl. No.: 881,924

[22] Filed: Feb. 27, 1978

[51] Int. Cl.³ .......................... F02B 3/10; F02D 5/00; F02M 7/06
[52] U.S. Cl. .................... 364/431; 123/340; 123/417
[58] Field of Search ....................... 364/424, 431, 442; 123/32 EA, 32 EE, 32 EG, 32 EH

[56] References Cited

U.S. PATENT DOCUMENTS

| | | | |
|---|---|---|---|
| 3,661,126 | 5/1972 | Baxendale | 123/32 EH |
| 3,749,065 | 7/1973 | Rothfusz | 123/32 EH |
| 3,858,561 | 1/1975 | Aono | 123/32 EA |
| 3,893,432 | 7/1975 | Krupp et al. | 123/32 EA |
| 4,020,802 | 5/1977 | Hattori et al. | 123/32 EH |
| 4,126,107 | 11/1978 | Harada et al. | 123/32 EH |
| 4,130,095 | 12/1978 | Bowler et al. | 123/32 EE |
| 4,159,697 | 7/1979 | Sweet | 123/32 EH |
| 4,176,625 | 12/1979 | Stauffer | 123/32 EH |
| 4,176,626 | 12/1979 | Norimatsu et al. | 123/32 EE |
| 4,184,461 | 1/1980 | Leung | 123/32 EH |

Primary Examiner—Felix D. Gruber
Attorney, Agent, or Firm—Gaylord P. Haas, Jr.; Russell C. Wells

[57] ABSTRACT

A method and apparatus for controlling the various functions of an internal combustion engine using a program-controlled microprocessor having a memory preprogrammed with various control laws and associated control schedules receives information concerning one or more engine-operating parameters such as manifold pressure, throttle position, engine coolant temperature, air temperature, engine speed or period and the like. These parameters are sensed and then supplied to input circuits for signal conditioning and conversion to digital words usable by the microprocessor system. The microprocessor system computes a digital word indicative of a computer-commanded engine control operation and output circuitry responds to predetermined computer-generated commands and to the computed digital command words for converting them to corresponding pulse-width control signals for controlling such engine operations as fuel-injection, ignition timing, proportional and/or on-off EGR control, and the like. A system is provided for sensing the immediate need for acceleration enrichment (by monitoring for an abrupt increase in manifold absolute pressure or throttle angle) and an interrupt request signal is sent to the microprocessor system which responds to the interrupt request to compute an acceleration enrichment digital word which the output circuitry uses to provide an immediate additional charge of fuel, and if a fuel charge is currently being applied at the time of the interrupt request, the additional acceleration enrichment fuel charge is applied immediately upon the completion of the normally-applied fuel charge.

15 Claims, 2 Drawing Figures

Microprocessor-Based
Electronic Engine Control System

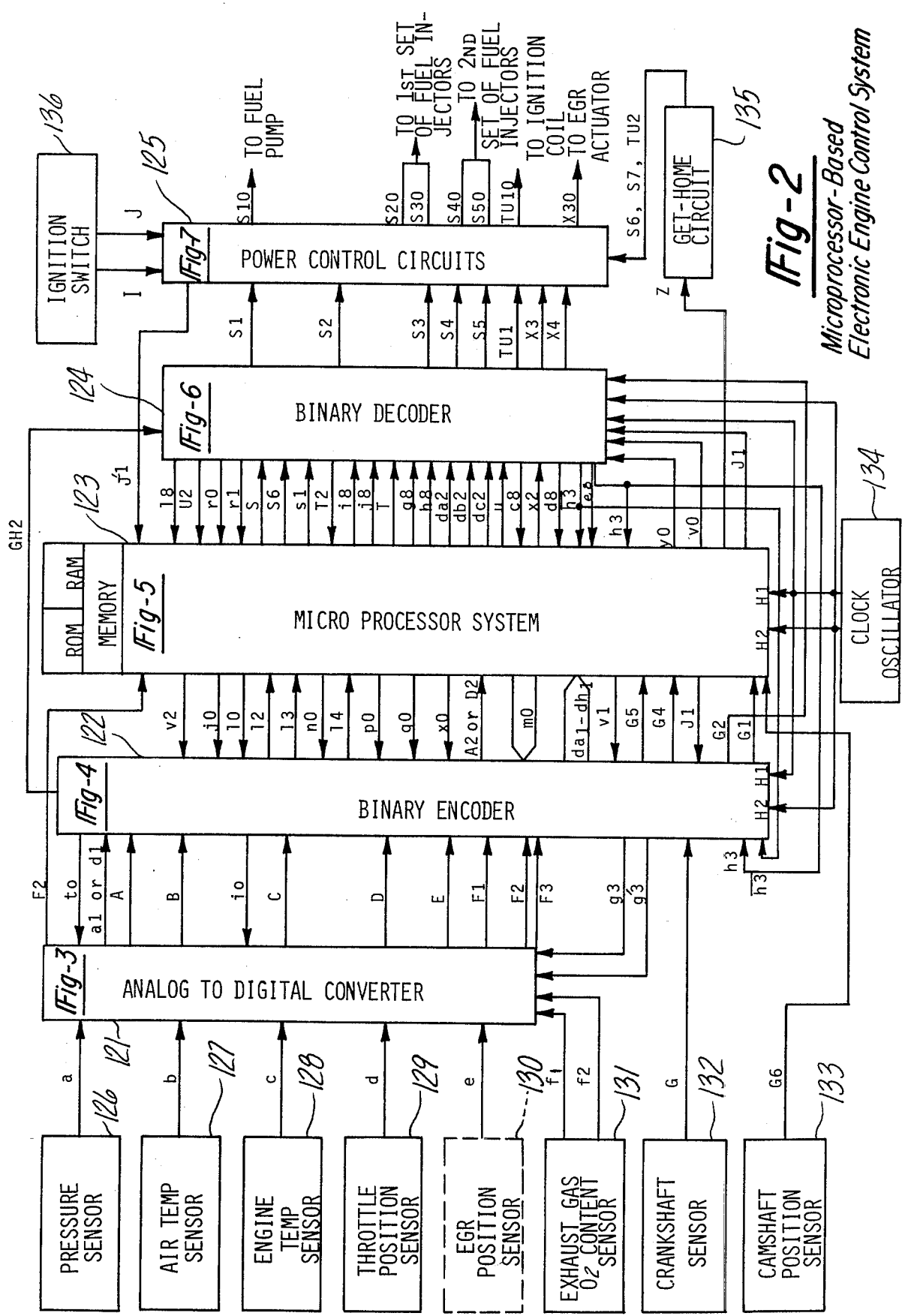

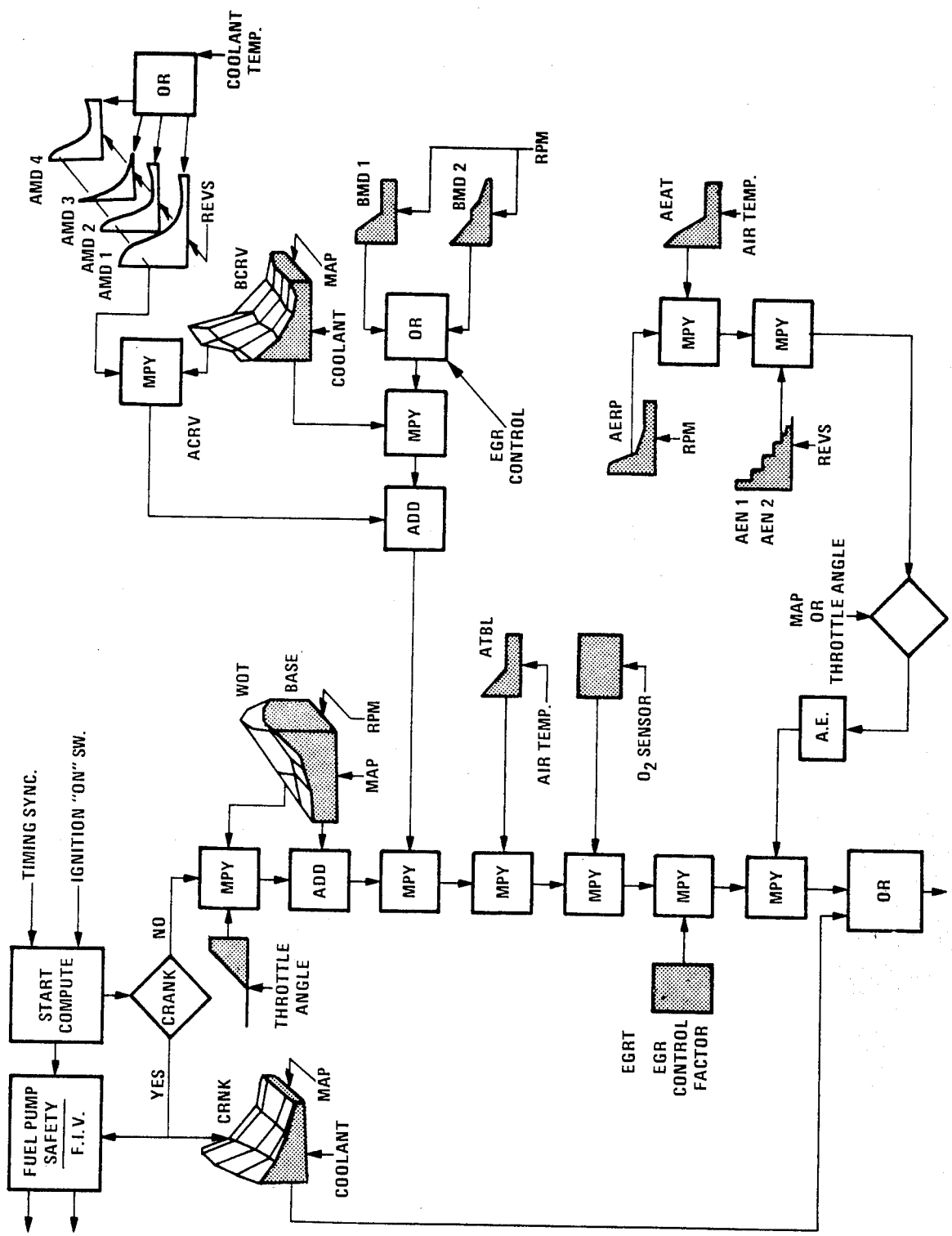
Fig-10.1
FUEL CONTROL LAW

MICROPROCESSOR-BASED ENGINE CONTROL SYSTEM WITH ACCELERATION ENRICHMENT CONTROL

BACKGROUND OF THE INVENTION

1. Field of the Invention

This invention relates generally to a method and apparatus for controlling an internal combustion engine, and more particularly to a microprocessor-based electronic engine control system having a memory preprogrammed with various control laws and control schedules responsive to one or more sensed engine-operating parameters and generating control signals for fuel injection, ignition timing, EGR control, and the like.

2. Statement of the Prior Art

Many of the patents of the prior art recognize the need for employing the enhanced accuracy of digital control systems for more accurately controlling one or more functions of an internal combustion engine.

U.S. Pat. No. 3,969,614 which issued to David F. Moyer, et al on July 13, 1976 is typical of such systems as are U.S. Pat. No. 3,835,819 which issued to Robert L. Anderson, Jr. on Sept. 17, 1974; U.S. Pat. No. 3,904,856 which issued to Louis Monptit on Sept. 9, 1975; and U.S. Pat. No. 3,906,207 which issued to Jean-Pierre Rivere, et al on Sept. 16, 1975. All of these Patents represent a break-away from the purely analog control systems of the past, but neither the accuracy, reliability, or number of functions controlled is sufficient to meet present day requirements.

Future internal combustion engines will require that emissions be tightly controlled due to ever-increasing governmental regulations, while fuel consumption is minimized and drivability improved over the entire operating range of the engine. None of the systems of the prior art provide a method and apparatus for controlling the operation of an internal combustion engine with sufficient accuracy to attain minimal emissions and minimal fuel consumption while simultaneously achieving improved drivability.

The systems of the prior art attempt to control one or more of the engine-operating functions but none attempts to control the operation of the fuel pump, fuel injection, engine ignition timing, on-off and/or proportional EGR control, and the like while using feedback from such devices as oxygen sensors for emission control purposes or for effecting a closed loop fuel control mode of operation, and yet including provisions for optimizing acceleration enrichment handling, and the like. Moreover, the systems of the prior art are extremely expensive, difficult to repair and maintain and are not commercially feasible at the present time.

These and other problems of the prior art, particularly poor drivability, results from the inability of the prior art systems to immediately respond to a request for a rapid increase in engine speed. The failure to rapidly respond to such a request results in a lean fuel charge being delivered to cylinders which induct air from a higher pressure manifold but have received a quantity of fuel calculated during a lower manifold pressure creating a "stumble" condition leading to poor drivability.

These and other problems of the prior are are solved by the system of the present invention which utilizes a program-controlled microprocessor system and means for detecting a need for acceleration enrichment for transmitting an interrupt to said microprocessor for permitting additional fuel to be immediately applied thereto.

If a previously-computed fuel charge is already being applied at tne time of the interrupt, the requied additional acceleration enrichment fuel is supplied immediately at the end of the current fuel charge.

SUMMARY OF THE INVENTION

A method and apparatus is provided for improving drivability by minimizing stumble. Means are provided for detecting an operator-commanded request for a rapid increase in engine speed for generating an acceleration enrichment request signal in response thereto. The acceleration enrichment request signal executes an interrupt in a program-controlled microprocessor having a memory means for storing look-up tables of control values and program means for implementing predetermined fuel control laws. The microprocessor is responsive to the receipt of said interrupt request signal for immediately commanding additional fuel to be supplied to the engine or if a previously-computed fuel charge is currently being supplied at the moment of the interrupt, then the microprocessor temporarily stores said interrupt and controls additional fuel to be immediately upon the completion of said currently-generated previously-computed fuel charge.

This application is one of fourteen applications filed on Feb. 27, 1978, all commonly assigned and having substantially the same specification and drawings, the fourteen applications being identified below:

| Serial Number | Title |
| --- | --- |
| 881,321 | Microprocessor-Based Electronic Engine Control System |
| 881,322 | Feedback-Compensated Ramp-Type Analog to Digital Converter |
| 881,323 | Input/Output Electronic For Microprocessor-Based Engine Control System |
| 881,324 | Switching Control of Solenoid Current in Fuel Injection Systems |
| 881,921 | Dual Voltage Regulator With Low Voltage Shutdown |
| 881,922 | Oxygen Sensor Qualifier |
| 881,923 | Ratiometric Self-Correcting Single Ramp Analog To Pulse Width Modulator |
| 881,924 | Microprocessor-Based Engine Control System Acceleration Enrichment Control |
| 881,925 | Improvements in Microprocessor-Based Engine Control Systems |
| 881,981 | Oxygen Sensor Feedback Loop Digital Electronic Signal Integrator for internal Combustion Engine Control |
| 881,982 | Improvements in Electronic Engine Controls System |
| 881,983 | Electronic Fuel Injection Compensation |

-continued

| Serial Number | Title |
|---|---|
| 881,984 | Ignition Limp Home Circuit For Electronic Engine Control Systems |
| 881,985 | Oxygen Sensor Signal Conditioner |

Application Ser. No. 881,321, has been printed in its entirety and the specification of that application is specifically incorporated herin by reference.

I claim:

1. In an internal combustion engine having an intake system, an exhaust system, an engine block, a plurality of cylinders disposed in said engine block, a piston mounted for reciprocal movement within each of said plurality of cylinders, throttle means disposed in said intake system for controlling the air flow into said plurality of cylinders, means generating a fuel control signal in response to sensed engine parameters, an electronic engine control system including means responsive to said fuel control signal for selectively supplying a controlled quantity of fuel into selected one or more of said plurality of cylinders, and means for controlling the timing the ignition timing of said air and fuel supplied to said selected one or more cylinders;

said electronic engine control system comprising program-controlled computing means, memory means for storing data representative of look-up tables of control schedules and control means for implementing a predetermined fuel control law;

means for sensing at least one engine-operating parameter for detecting a need for acceleration enrichment and for generating an acceleration enrichment command in response thereto;

means responsive to said acceleration enrichment command for transmitting an acceleration enrichment interrupt request signal to said computing means, said computing means being responsive to said acceleration enrichment interrupt request signal for generating signals to implement said fuel control law stored in said memory means and generating an acceleration enrichment fuel pulse command word signal in response thereto; and means responsive to said acceleration enrichment fuel pulse command word signal for initiating the immediate generation of a separate one-time acceleration enrichment fuel control pulse in response thereto or, if a normal fuel control pulse is currently being generated at the time of said acceleration enrichment interrupt request, for initiating the generation of said additional onetime acceleration enrichment fuel control pulse immediately upon the completion of said currently-generated normal fuel control pulse.

2. In an internal combustion engine, an engine control system including means responsive to a fuel control pulse for supplying a controlled quantity of fuel to said engine and further including electronic engine control means responsive to measured engine-operating parameters for controlling the generation of said fuel control pulse, the improvement comprising:

means for detecting the need for acceleration enrichment and for generating an interrupt signal indicative thereof;

means responsive to said interrupt signal indicative of a need for acceleration enrichment for enabling said engine control system to immediately generate an additional separate acceleration enrichment fuel control pulse in response thereto if said engine control means is not already generating a normal fuel control pulse, and for generating an additional delayed acceleration enrichment fuel control pulse at the termination of and as an extension to an existing normally-generated fuel control pulse if such is currently being generated.

3. The improved internal combustion engine system of claim 1 wherein said means for sensing at least one engine-operating parameter for detecting a need for acceleration enrichment includes means responsive to the rate of change of the measured manifold absolute pressure for generating a signal indicative of a need for acceleration enrichment and for generating said acceleration enrichment command in response thereto.

4. The improved internal combustion engine system of claim 3 wherein said means responsive to the rate of change of said measured manifold absolute pressure includes sensor means for measuring manifold absolute pressure and generating an analog output signal indicative thereof and means for differentiating said analog output signal for detecting a rapid change therein, said means for differentiating including an input node, means for operatively coupling said analog output signal indicative of measured manifold absolute pressure to said input node, a comparator having first and second comparator inputs and a comparator output, a diode having its anode coupled to said input node and its cathode resistively coupled to a first comparator input, resistive means operatively coupling said input node to said second comparator input, capacitor means coupled between a source of potential and said resistive means from a low pass filter which acts as the delay to said analog output signal presented to said input node, said diode providing a small voltage drop difference between the signals presented to said first and second comparator inputs such that so long as said analog output signal presented to said input node is a slowly rising signal, indicating a normal operating engine condition where no acceleration enrichment is required, the output of said comparator will remain in a first comparator output state and will not generate said acceleration enrichment command, but when a fast rising analog input signal is supplied to said input node, which amounts to a change in value of greater than the voltage drop across said diode, a high signal will be supplied to said first comparator input since the low pass filter effect of said capacitor means and resistive means coupling said input node to said second comparator input will cause a slower rise at said second input, thereby causing the output of said comparator to generate said acceleration enrichment command, the voltage supplied to said comparator input catching up to the level of voltage supplied to said first comparator input as said capacitive means becomes charged to the level of said analog input signal to again cause the output of said comparator to return to said first state and terminate said acceleration enrichment signal such that the pulse-width duration of said acceleration enrichment command is indicative of the magnitude of the rate of change of said analog input signal and therefore determinative of the amount of acceleration enrichment required.

5. The improved internal combustion engine system of claim 4 wherein said system includes means for generating a "cranking mode" signal indicative of said internal combustion engine being in a starting state and means responsive to said "cranking mode" signal for disabling the output of said comparator to prevent the generation of said acceleration enrichment command during engine starting and the like.

6. The improved internal combustion engine system of claim 1 wherein said throttle means includes a throttle plate whose angular position controls the flow of air into said plurality of cylinders and wherein said means for sensing at least one engine-operating parameter for detecting a need for acceleration enrichment includes means responsive to the rate of change of said throttle angle for generating a signal indicative of a need for acceleration enrichment and for generating said acceleration enrichment command in response thereto.

7. The improved internal combustion engine system of claim 6 wherein said means responsive to the rate of change of said measured throttle angle includes sensor means for measuring throttle angle and generating an analog output signal indicative thereof and means for differentiating said analog output signal for detecting a rapid change therein, said means for differentiating including an input node, means for operatively coupling said analog output signal indicative of measured throttle angle to said input node, a comparator having first and second comparator inputs and a comparator output, a diode having its anode coupled to said input node and its cathode resitively coupled to a first comparator input, resistive means operatively coupling said input node to said second comparator input, capacitor means coupled between a source of potential and said resistive means from a low pass filter which acts as the delay to said analog output signal presented to said input node, said diode providing a small voltage drop difference between the signals presented to said first and second comparator inputs such that so long as said analog output signal presented to said input node is a slowly rising signal indicating a normal operating engine condition where no acceleration enrichment is required, the output of said comparator will remain in a first comparator output state and will not generate said acceleration enrichment command, but when a fast rising analog input signal is supplied to said input node which amounts to a change in value of greater than the voltage drop across said diode, a high signal will be supplied to said first comparator input since the low pass filter effect of said capacitor means and resistive means coupling said input node to said second comparator input will cause a slower rise at said second input thereby causing the output of said comparator to generate said acceleration enrichment command, the voltage supplied to said comparator input catching up to the level of voltage supplied to said first comparator input as said capacitive means becomes charged to the level of said analog input signal to again cause the output of said comparator to return to said first state and terminate said acceleration enrichment signal such that the pulse-width duration of said acceleration enrichment command is indicative of the magnitude of the rate of change of said analog input signal and therefore determinative of the amount of acceleration enrichment required.

8. The improved internal combustion engine system of claim 7 wherein said system includes means for generating a "cranking mode" signal indicative of said internal combustion engine being in a starting state and means responsive to said "cranking mode" signal for disabling the output of said comparator to prevent the generation of said acceleration enrichment command during engine starting and the like.

9. The improved internal combustion engine system of claim 1 wherein said means responsive to said acceleration enrichment command further includes, in addition to said means for generating said immediate one-time acceleration enrichment pulse, an additional means for modifying the operation of said program means for effecting a long-term acceleration enrichment alteration of said normally-generated fuel control pulse in response to said acceleration enrichment interrupt request.

10. The improved internal combustion engine system of claim 1 wherein said computer means further includes memory means for storing at least one look-up table containing a control schedule of acceleration enrichment fuel control pulse modifier values stored as a function of engine coolant temperature and wherein said system further includes means for measuring engine coolant temperature and generating a signal indicative thereof, means responsive to said signal indicative of measured engine coolant temperature for generating a coolant temperature word indicative thereof, said memory means being addressed by said coolant temperature word and said computing means interpolating between coolant temperature word addresses for calculating a particular acceleration enrichment fuel control pulse modifier value corresponding to the actual measured value of engine coolant temperature represented by said coolant temperature word, said computing means utilizing said particular modifier value in executing said program means to implement said fuel control law and calculate an acceleration enrichment-modified fuel pulse command word in response thereto.

11. The improved internal combustion engine of claim 2 wherein said means responsive to said interrupt signal indicative of said need for acceleration enrichment for immediately generating said additional one-time initial acceleration enrichment fuel control pulse further includes means responsive to said normally-computed primary fuel control pulse being generated during generation of said one-time acceleration enrichment fuel control pulse for delaying the generation of said normally-generated fuel control pulse until determination of said one-time acceleration enrichment fuel control pulse.

12. A method for maintaining smooth engine performance in an internal combustion engine comprising the steps of:
monitoring the value of one of manifold absolute pressure and throttle angle;
detecting a rapid change in said monitored value of one of said manifold absolute pressure and throttle angle;
generating an acceleration enrichment interrupt request in response to the detection of said rapid change in said monitored value of one of said manifold absolute pressure and throttle angle;
measuring the actual value of engine coolant temperature;
computing an initial and immediate Tip-In acceleration enrichment command as a function of said measured value of engine coolant temperature to determine the initial and immediate amount of fuel to be injected into said engine for acceleration enrichment purposes;

immediately generating a Tip-In acceleration enrichment fuel control pulse in response to said Tip-In acceleration enrichment command to supply a controlled quantity of fuel to a selected one or more of the cylinders of said internal combustion engine unless said internal combustion engine is currently generating a normally-computed main fuel control pulse;

temporarily storing said acceleration enrichment interrupt request for delaying the computing of said acceleration enrichment command and the generation of said Tip-In acceleration enrichment fuel control pulse whenever said normally-computed main fuel control pulse is currently being generated; and otherwise temporarily storing said acceleration enrichment request and delaying the computing of said acceleration enrichment command and the generation of said Tip-In acceleration enrichment fuel control pulse if said normally-calculated main fuel control pulse is currently being generated; and adding said Tip-In acceleration enrichment fuel control pulse to said normally-calculated main fuel control pulse immediately upon its termination for extending the pulse-width duration of said normally-calculated main fuel control pulse by the pulse-width of said Tip-In acceleration enrichment fuel control pulse so as to compensate for rapid changes in acceleration and ensure smooth running engine operations.

13. The method of claim 12 including the additional steps of computing said normally-calculated main fuel control pulses subsequent to the generation of said acceleration enrichment interrupt request as a function of engine RPM, air temperature, coolant temperature and the like to gradually increase or decrease the normally-computed value thereof for long-term acceleration enrichment compensation.

14. In an internal combustion engine system including an intake system, an exhaust system, throttle means disposed at least partially within said intake system for selectively controlling the flow of air into said engine, said throttle means including a throttle plate whose angle determines said air flow, an engine block, the plurality of cylinders disposed in said engine block, a piston operatively disposed for reciprocal movement within each of said plurality of cylinders in response to the combustion of fuel and air therein, means responsive to fuel control pulses for selectively controlling the quantity of fuel supplied to a selected one or more of said plurality of cylinders, means for measuring at least one of said throttle angle and the manifold absolute pressure existing in said intake system, means responsive to the measurement of said at least one of said throttle angle and said manifold absolute pressure for generating a signal indicative thereof, means responsive to said signal indicative of the measured value of at least one of said throttle angle and manifold absolute pressure for sensing a rapid change therein and generating an acceleration enrichment interrupt request in response thereto, a microprocessor-based electronic engine control system including a computer means, a memory means operatively coupled to said computer means, control means stored within said memory means for generating control signals to implement at least one fuel control law and for performing calculations for interpolating between addresses in said memory means, said memory means storing a plurality of look-up tables of modifier values representing control surfaces utilized in implementing said at least one fuel control law and being addressable by various measured engine-operating parameters, the improvement comprising said computer means being responsive to said acceleration enrichment request for addressing one of said plurality of look-up tables stored in said memory means and implementing said program means to interpolate between stored values for computing an acceleration enrichment command, means reponsive to said acceleration enrichment command for immediately generating a Tip-In fuel control pulse whose pulse-width is dictated by the value calculated from interpolating the control surface of said at least one look-up table stored in said memory means if the normally-calculated main fule control pulse is not currently being generated but for storing and delaying the generation of said Tip-In fuel control pulse in response to said acceleration enrichment request if said normally-computed main fuel control pulse is currently being generated and immediately adding said Tip-In fuel control pulse at the termination of said main fuel control pulse for extending same and therefore increasing the quantity of fuel supplied to said selected one or more of said plurality of cylinders for enriching the fuel mixture existing therein for compensating for the detected acceleration and maintaining smooth engine operations.

15. The improved engine-operating system of claim 14 wherein said computer means includes means further responsive to said acceleration enrichment interrupt for causing said program means to alter the computation of the next normally-calculated main fuel control pulse for increasing and decreasing same to provide for a long-term gradual acceleration enrichment compensation.

* * * * *